United States Patent Office 3,255,350
Patented June 7, 1966

3,255,350
THERMOLUMINESCENT DOSIMETRY METHOD
Richard C. Fix, Bedford, Mass., assignor to Controls for Radiation, Inc., Cambridge, Mass., a corporation of Massachusetts
Filed Dec. 10, 1962, Ser. No. 243,503
3 Claims. (Cl. 250—83)

This invention is directed to radiation dosimetry and more particularly to novel and improved dosimetry methods and apparatus which provide an accurate indication of radiation dose.

The dangers of radiation on animals and humans is well known. Therefore, in all areas where workers may be exposed to radiation it is advisable to provide monitoring apparatus. In addition, many scientific fields of study, as for example cancer research, involve the use of sources of intense nuclear radiation, the level of which is monitored. A number of dosimeters or detectors have been proposed for indicating the amount of radiation present, including dosimeters of the thermoluminescent type. Dosimeters of the latter type utilize the characteristic of many crystalline substances among them, well known, natural occuring materials such as quartz, which, if they are heated after exposure to radiation, luminesce or give off light and for this reason such materials are commonly characterized as "thermoluminescent." The luminescence of these substances is caused by the thermal release of electrons from an excited state in which they have been placed by the radiation incident upon the crystalline structure.

A radiation dosimeter should provide an indication of the effect of radiation on cell tissue, that is the radiation dose to which the cell tissue has been or would have been exposed. For this purpose it is desirable that the utilized radiation sensor have the same response to radiation as does cell tissue. Tissue reaction to radiation involves electron excitation phenomena but substantially no reaction in the atomic nucleus, and tissue damage is caused by both charged radiation and uncharged radiation such as neutrons, gamma rays and X-rays. The response of many thermoluminescent materials to neutron radiation is a reaction in the nucleus such as $(n, \gamma)$ or $(n, 2n)$ which, while a response to radiation, is not the tissue response, and therefore such materials do not provide accurate dosimetry indications. The other thermoluminescent materials exhibit only minimal thermoluminescence in response to neutron radiation although extensive radiation damage in tissue may be caused by such particles which interact with cell tissues as indicated above.

In dosimetry applications it is frequently desirable to know the neutron dose for example, and accordingly an object of this invention is to provide a novel and improved radiation dosimeter of the thermoluminescent type which provides an indication of neutron dose to which the dosimeter has been exposed.

Another object of the invention is to provide novel and improved methods and apparatus employing materials having thermoluminescent characteristics to provide an accurate indication of neutral particle radiation doses.

Still another object of the invention is to provide a novel and improved thermoluminescent dosimeter which accurately simulates tissue response to both charged and uncharged radiation.

In accordance with the invention there is provided a thermoluminescent material in powdered form which is disposed in intimate contact with a hydrogenous material capable of being completely removed from the thermoluminiscent material. This thermoluminescent material is of the type in which its nucleus has negligible reaction with uncharged particles. In the preferred embodiment the thermoluminescent material employed is lithium-7 fluoride and the hydrogenous material is alcohol. These are placed in a dosimeter capsule or container of non-hydrogenous material whose constituents all have relatively low atomic numbers (that is, below 17 in the Periodic Table and preferably below 10) such as the tetrafluoroethylene polymer sold under the trademark Teflon. Other suitable types of hydrogenous materials which may be completely removed from the thermoluminescent material include plastics, such as a powdered acrylic resin (Lucite) of a different sieve size than the thermoluminescent material, which may be removed by mechanical separation, or materials capable of complete separation from the thermoluminescent material by flotation processes for example.

In use, this dosimeter unit may be coupled with a complementary dosimeter of the same configuration and containing the same type and amount of thermoluminescent material but without the incorporation of any hydrogenous material. Both dosimeters are placed in the environment of interest. Should any neutron radiation be present, that radiation will react with the hydrogenous material to produce protons and the thermoluminescent material in intimate contact with the hydrogenous material will be affected by those protons with its electrons being placed in a metastable state. The complementary dosimeter will be affected by the neutron radiation only to a minimal extent because of the small probability of nuclear reactions in the thermoluminescent material. To measure the neutron radiation exposure, each dosimeter unit of thermoluminescent material is heated in a readout operation. However, in order to insure the accurate sensing of the emitted light level the hydrogenous material is first completely removed, and in the case of alcohol this is easily accomplished by volatalizing the alcohol. This can be accomplished simultaneously with the removal of the lower minor response peak of the lithium-7 fluoride which occurs at about 95° C. by heating the mixture at that temperature for about five minutes. After the hydrogenous material has been removed, the pure thermoluminescent material is heated through its complementary dosimeter is similarly heated and the released is measured to provide an indication of the amount of radiation to which the dosimeter was exposed. The complementary dosimeter is similarly heated and the released light is also measured. The readout of the first dosimeter provides an indication of the total radiation, the readout of the complementary dosimeter provides an the readout of the charged particle radiation, and the difference in output of the two dosimeters provides an accurate indication of the neutral particle radiation in the area of interest.

Thus the invention provides radiation dosimeter apparatus of the thermoluminescent type which may be used to measure neutron radiation. The apparatus may be housed in compact units that are easily handled and manipulated and provides an accurate indication of neutron radiation. It may be manufactured in a variety of configurations including miniature capsules which may be placed within the bodies of animals to measure radiation levels at specific points experimentally, as for example due to nuclear bomb exposions, and compact safety devices for personnel working in areas where it is necessary to guard against neutral particle radiation damage. Should it not be necessary to distinguish neutral radiation from other sources of radiation which may damage tissue, the total radiation effect of neutral and charged particle radiation may be measured by a single dosimeter unit, as indicated above.

Other objects, features and advantages of the invention will be seen as the following description of preferred embodiments thereof progresses in conjunction with the drawing, in which.

Figure 1:
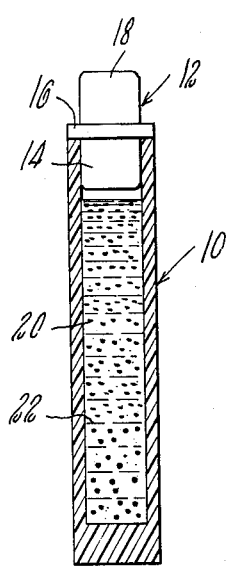
FIG. 1 is a diagrammatic view of a radiation dosimeter of the thermoluminescent type constructed in accordance with the invention.
Figure 2:
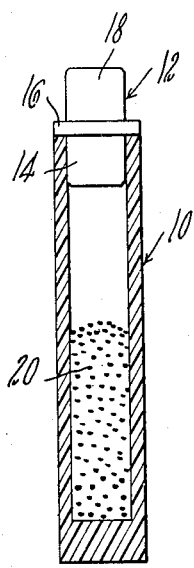
FIG. 2 is a diagrammatic elevational view of a complimentary dosimeter of the thermoluminescent type for use with the dosimeter shown in FIG. 1.
Figure 3:
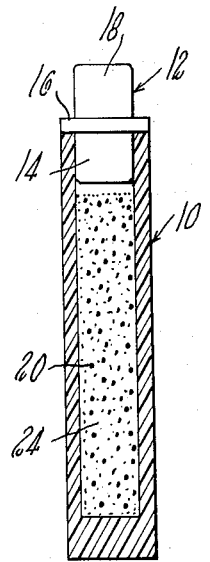
FIG. 3 is a diagrammatic elevational view of a second form of thermoluminescent dosimeter constructed in accordance with the invention.

Each of the thermoluminescent dosimeters shown in FIGS. 1-3 includes a housing in the form of an elongated cylindrical tube 10 of Teflon having a closure member 12 of the same material. This cap has a lower cylindrical portion 14 which fits snugly within the bore of the cylindrical container 10, an annular outwardly extending flange 16 at an intermediate portion of the cap 12 to provide a surface which is seated against the top surface of the cylindrical tube 10 and an upper portion of a configuration similar to the lower portion 14.

Housed within the tubular container is a thermoluminescent material 20 generally indicated by the dots. In the preferred embodiments this material is lithium-7 fluoride of 100-200 mesh particle size, that is the particles will pass through a size 100 mesh but not through a size 200 mesh. Mixed with the thermoluminescent material is a hydrogenous material which does not interact in any way with the thermoluminescent material in a manner so that the two materials are in uniform and intimate contact throughout the mixture. In the embodiment shown in FIG. 1 a volatizable hydrogenous material 22 such as alcohol is intermixed with the thermoluminesent material 20 and in the embodiment shown in FIG. 3 the hydrogenous material 24 is powdered Lucite (an acrylic resin) of 200-300 mesh particle size. In the complementary dosimeter unit shown in FIG. 2 only powdered thermoluminescent material 20, of the same type and amount as in the other containers, is stored therein.

After each tube 10 is filled with one or more materials the cap 12 is placed in closure position and is heated to provide a tight seal between the cap and the mating cylindrical wall portion of the tube. The dosimeter containers in this form may be then placed in the area of interest for radiation surveillance. Due to the inert nature of the container, the dosimeter may be placed beneath the surface of animal tissues in live animals, for example, to determine the intensity of radiation at that point when the animals are exposed to a particular intense neutron radiation source for example. In such an experiment a matched pair or complementary pair of dosimeters would be employed, one of the type shown in FIGS. 1 or 3 and a second of the type shown in FIG. 2.

After exposure, or to determine whether a dosimeter has, in fact, been exposed to radiation, the containers are removed from the environment of interest and carefully opened with the contents of each being maintained separated. As an initial step the hydrogenous material is completely removed from the presence of the thermoluminescent material, for example by volatalizing the alcohol 22 or by mechanically sifting to separate the Lucite particles 24 from the thermoluminescent crystals. In either case all by the hydrogenous material is removed so that no residue is left which might obscure the light emitted by the thermoluminescent material when it is heated. After this is accomplished the thermoluminescent material, without any residue of hydrogenous material, is heated in a controlled environment through a cycle, which in the case of lithium-7 fluoride is over the range of 200° C. to 300° C. (A subsidiary thermoluminescent response is generated by lithium-7 fluoride at a temperature of about 95° C. but this response decays relatively rapidly and can be completely removed by heating the material to a temperature of approximately 95° C. for a period of about five minutes.) The light that is emitted by the material is measured by suitable equipment such as a photomultiplier that is sufficiently sensitive to measure the extremely low light output produced by these materials after exposure to charged particle dosages as small as one milliroentgen. As the light output is proportional to the intensity of the radiation to which the thermoluminescent material has been exposed, an indication of the dose of the charged particle radiation to which the thermoluminescent material has been exposed is obtained.

In exposure to radiation, the hydrogenous material in intimate contact with the particles of the thermoluminescent material reacts with uncharged particles that impinge on the hydrogenous material to create a charged particle (usually a proton) which in turn reacts with the thermoluminescent material as do externally generated charged particles to place electrons in excited states in a stored fashion. Thus the dosimeter which includes both thermoluminescent radiation sensitive material and the hydrogenous material provides an indication of the total amount of radiation present in the area under surveillance. The complimentary dosimeter (that shown in FIG. 2), which contains only thermoluminescent material, has only minimal response to the neutral particles and thus its output is a function primarily of the charged particle radiation impinging thereon. (The non-hydrogenous casing material is employed to insure that the output of the complimentary dosimeter is accurately related to neutral particle radiation from external sources.) The difference between the two output indications provides an accurate measure of the magnitude of uncharged particle radiation present in the surveillance area.

While preferred embodiments of the invention have been shown and described, various modifications thereof will occur to those skilled in the art, and therefore it is not intended that the invention be limited to the disclosed embodiments or to details thereof and departures may be made therefrom within the spirit and scope of the invention as defined in the claims.

I claim:

1. The method of detecting uncharged nuclear particle radiation comprising the steps of exposing a mixture of thermoluminescent material and a hydrogenous material in intimate contact with one another to radiation,
    completely removing said hydrogenous material from said thermoluminescent material without heating said thermoluminescent material to the primary thermoluminescent threshhold,
    heating said thermoluminescent material above said threshhold,
    and measuring the light emitted from said thermoluminescent material during said heating operation.

2. The method of radiation dosimetry comprising the steps of exposing a mixture of a multiplicity of thermoluminescent crystal particles disposed in a liquid hydrogenous material to radiation,
    completely removing said liquid hydrogenous material from said thermoluminescent particles without heating said thermoluminescent particles above a thermoluminescent threshhold of said particles,
    heating said thermoluminescent particles above said threshhold, and measuring the light emitted from said thermoluminescent particles during said heating operation.

3. The method of neutron radiation dosimetry comprising the steps of simultaneously exposing two equal quantities of thermoluminescent particles to radiation while one of said quantities is in intimate contact with a hydrogenous material,
  completely removing said hydrogenous material from said one quantity without heating said one quantity to the primary thermoluminescent threshhold of the particles in said one quantity,
  separately heating each quantity of said thermoluminescent particles above its thermoluminescent threshhold and comparing the light emitted from said quantities as a result of the heating operation.

References Cited by the Examiner
UNITED STATES PATENTS

| | | | |
|---|---|---|---|
| 2,616,051 | 10/1952 | Daniels | 250—71 |
| 2,775,710 | 12/1956 | Ludeman | 250—71 |
| 3,141,973 | 7/1964 | Heins | 250—83 |

FOREIGN PATENTS 587,741   5/1947   Great Britain.

OTHER REFERENCES

Radiation Dosimetry by Hine, Academic Press, 1956, pages 293, 294, 677 and 678.

RALPH G. NILSON, *Primary Examiner.*

JAMES W. LAWRENCE, *Examiner.*